(12) United States Patent
Tschernoster et al.

(10) Patent No.: US 6,546,331 B2
(45) Date of Patent: Apr. 8, 2003

(54) METHOD FOR LONGITUDINALLY CONTROLLING A VEHICLE IN WHICH INFORMATION FROM A NAVIGATION SYSTEM IS RECORDED

(75) Inventors: Oliver Tschernoster, Munich (DE); Uwe Proemm, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/962,205

(22) Filed: Sep. 26, 2001

(65) Prior Publication Data
US 2002/0038179 A1 Mar. 28, 2002

(30) Foreign Application Priority Data
Sep. 27, 2000 (DE) .......................................... 100 47 751

(51) Int. Cl.⁷ .............................................. G01C 21/00
(52) U.S. Cl. .................. 701/200; 701/93; 340/995; 180/170
(58) Field of Search .............................. 701/93, 95, 96, 701/200, 208, 51, 55, 65; 180/170, 176, 179; 340/901, 990, 995

(56) References Cited

U.S. PATENT DOCUMENTS

| | | | | |
|---|---|---|---|---|
| 5,504,482 A | * | 4/1996 | Schreder | 340/995 |
| 5,539,397 A | * | 7/1996 | Asanuma et al. | 340/901 |
| 5,901,806 A | * | 5/1999 | Takahashi | 180/170 |
| 6,098,005 A | * | 8/2000 | Tsukamoto et al. | 701/65 |
| 6,166,658 A | * | 12/2000 | Testa | 701/93 |
| 6,182,000 B1 | * | 1/2001 | Ohta et al. | 701/55 |
| 6,199,001 B1 | * | 3/2001 | Ohta et al. | 701/51 |
| 6,292,736 B1 | * | 9/2001 | Aruga et al. | 701/95 |

FOREIGN PATENT DOCUMENTS

| | | |
|---|---|---|
| DE | 195 14 023 | 10/1976 |
| DE | 197 55 963 | 6/1998 |
| DE | 197 04 854 | 8/1998 |
| DE | 198 21 803 | 11/1999 |

* cited by examiner

Primary Examiner—Gary Chin
(74) Attorney, Agent, or Firm—Crowell & Moring LLP

(57) ABSTRACT

In a method for the longitudinal control of a vehicle, where information from a navigation system is recorded and where a target value of at least one parameter for longitudinal control is determined in dependence on the information from the navigation system, the information from the navigation system is used to determine the probability with which the vehicle will drive onto a highway entrance. When the probability is higher than a specified threshold the control unit uses a longitudinal acceleration that is increased compared to regular operation.

8 Claims, 2 Drawing Sheets

METHOD FOR LONGITUDINALLY CONTROLLING A VEHICLE IN WHICH INFORMATION FROM A NAVIGATION SYSTEM IS RECORDED

BACKGROUND AND SUMMARY OF THE INVENTION

This application claims the priority of German patent document 100 47 751.8, filed Sep. 27, 2000, the disclosure of which is expressly incorporated by reference herein.

The invention relates to a method for the longitudinal control of a vehicle in which information from a navigation system is recorded.

Such a method for longitudinally controlling a vehicle has been known, for example, from German patent document DE 196 38 511 A1. This reference particularly describes speed control systems that select the drive and/or brake systems of a vehicle in such a way that either a target speed or a target distance to the vehicle in front is adjusted. In the method known from DE 196 38 511 A1, such speed control systems are supplied with information from a navigation system that is also installed in the vehicle. For this purpose, for example, a control device that is allocated to the longitudinal control system can have an interface to the navigation system's electronics.

Familiar longitudinal control systems have so far been designed in such a way that during regular operation the same longitudinal acceleration to the set target speed takes place for all situations when a subsequent trip is terminated and/or when the longitudinal control and/or speed control is turned on (again) from a switched-off state.

The goal of the invention is to perform adjustments to situations on a longitudinal control system of the above-described type while utilizing the information from the navigation system.

This goal is achieved by a method for the longitudinal control of a vehicle in which information from a navigation system is recorded and where, in dependence on the information of the navigation system, a target value of at least one parameter for longitudinal control is determined. Through the information from the navigation system, the probability (w) is determined with which the vehicle will drive onto a highway entrance. A longitudinal acceleration, which is increased in comparison with regular operation, takes place when the probability (w) is higher than a specified threshold. Beneficial embodiments of the invention are the objects of the dependent claims.

Particular focus with regard to the object of the invention is directed at the situation occurring at highway entrances, where a desire by the driver for increased dynamics should be expected.

Based on the invention, the probability ("entering probability") with which the vehicle will drive on a highway entrance is determined with the information from the navigation system. When the entering probability is higher than a specified threshold (variable or fixed) and the speed control is switched on, a longitudinal acceleration that is higher than would otherwise occur during regular operation takes place. Preferably, a longitudinal acceleration progression is specified, which determines higher longitudinal acceleration as well as a higher longitudinal acceleration gradient in dependence of the vehicle speed.

The map of a navigation system generally consists of a multitude of route segments that are arranged in a tree-shaped diagram. In order to determine the entering probability, the system checks at the beginning of each current defined route segment whether a highway entrance exists and whether the highway entrance is located on the programmed route and/or whether at least one operating parameter of the vehicle indicates a desire on the part of the driver to enter the highway. Such operating parameters are, e.g. actuation of a turn signal or the set vehicle speed. The entering probability will be higher when the driver actuates the turn signal in the typical direction for highway entrances for each respective country (e.g. in Germany, to the left ("right-hand traffic"), in England, to the right ("left-hand traffic")) and/or when the entrance is part of the route programmed in the driver's navigation system. Furthermore, e.g. a high set vehicle speed also indicates a higher entering probability.

The invented method is preferably integrated into a control device that is already provided for a longitudinal control system. Then, only an interface to the navigation system must be established.

The invented inquiry and processing method for information from the navigation system on current and future context permits adaptive control that is adjusted to the respective situation as well as driver-typical control of the longitudinal dynamics with a longitudinal control system. Functional quality and driving comfort are increased.

Other objects, advantages and novel features of the present invention will become apparent from the following detailed description of the invention when considered in conjunction with the accompanying drawings.

DETAILED DESCRIPTION OF THE DRAWINGS

The invented longitudinal control system contained in the vehicle must decide how high is the probability "w" (entering probability) with which the vehicle will drive on a highway entrance.

Figure 1:
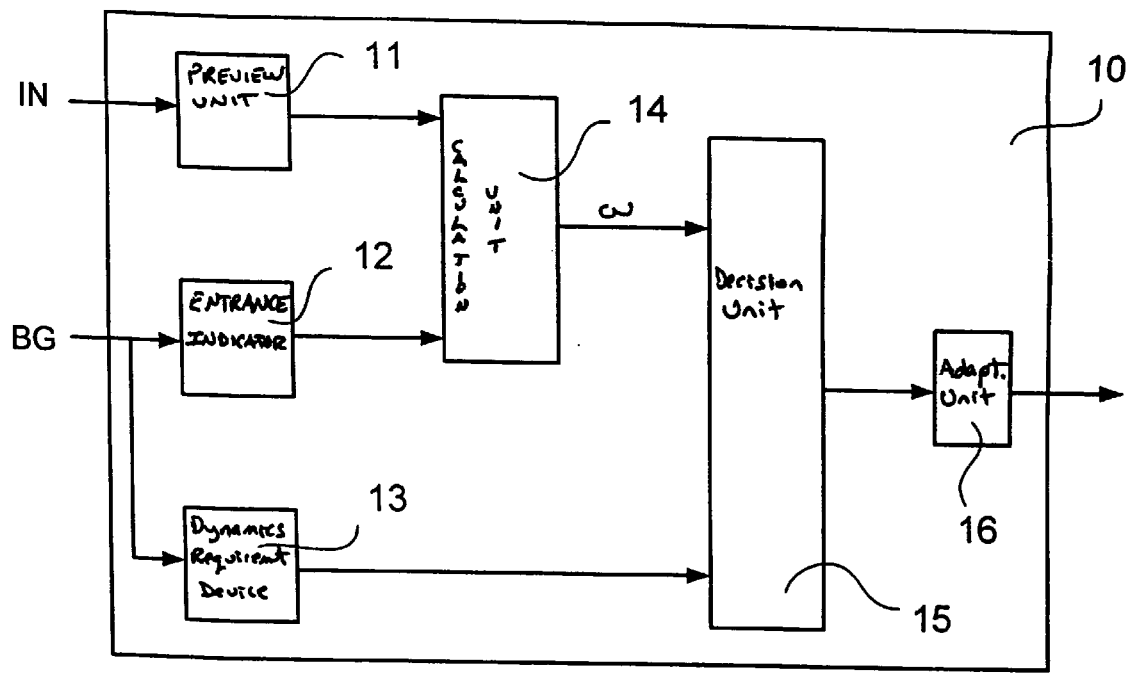
FIG. 1 shows a basic structure of the concept for longitudinal dynamics control that is adjusted to the situation.

For this purpose, the control device 10 of the longitudinal control system in the vehicle, which is shown more closely in FIG. 1, evaluates information IN from the navigation system on one hand and additional operating parameters BG of the vehicle on the other hand.

The information IN can be, for example, the actual position of the vehicle, the street category (highway, not highway), the length of the respective route segment, the existence of a highway entrance in the route segment and information whether a highway entrance is part of the route programmed by the driver. The operating parameters BG can be e.g. a turn signal, a steering angle signal, a vehicle speed signal, a pedal transmitter signal or actuation signals of the actuating lever allocated to the longitudinal control system.

The preview block 11 checks at the beginning of the route segment whether a highway entrance exists and whether it is part of the route. The entrance desire determining device 12 checks whether the set vehicle speed is high or low and whether the turn signal is set in the direction of the entrance. The entering probability w is determined in the calculation block 14 in dependence on the result of these inquiries.

Figure 2:
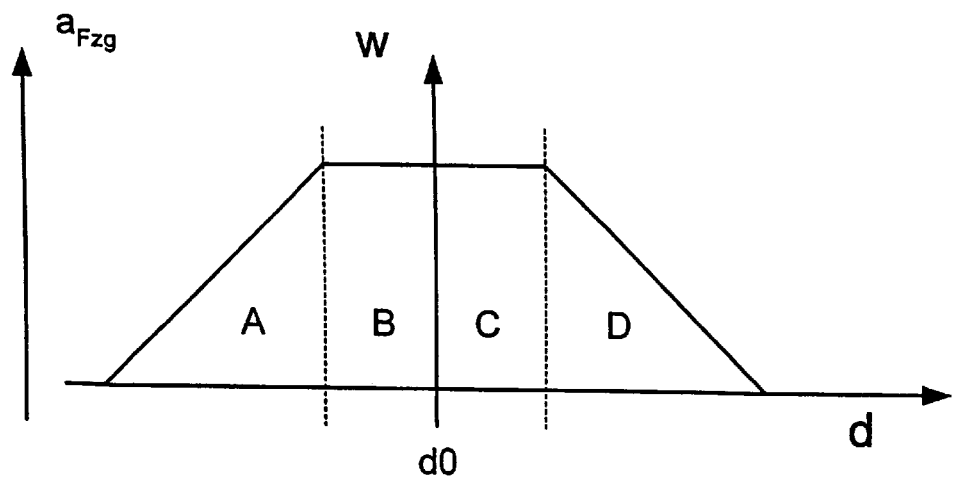
FIG. 2 graphically illustrates the entering probability dependent on the proximity of the vehicle to the highway entrance.

The concept of calculating the entering probability w is explained with the help of the example of the so-called basic probability (FIG. 2). It is dependent upon the positioning accuracy of the navigation system (quality of the navigation system) and the distance d of the vehicle from the highway entrance. The highway entrance is theoretically located at the distance do. A decisive factor is the so-called decision segment A (before the theoretical entrance). When the speed control is switched on (switched off during a subsequent trip and/or newly set at the target speed), the longitudinal acceleration "a" can, for example, be increased in the segment A (for before the theoretical entrance) and/or D (for after the theoretical entrance) proportionally to the progression of the probability w. In the segments B and/or C, the maximum longitudinal acceleration $a_{max}$ can be specified.

In the decision device 15, the increase in the longitudinal acceleration is deactivated when the driver's desire for less driving power is recorded via the dynamics requirement determination device 13 (e.g. via the actuating element for reducing the set speed, which is allocated to the longitudinal control system). In the parameter adaptation block 16 the control parameters for values that need to be controlled (here: target speed and/or target acceleration and target acceleration gradient) are specified in accordance with the output of the decision device 15 and issued to the actuators via the control device 10.

Figure 3:
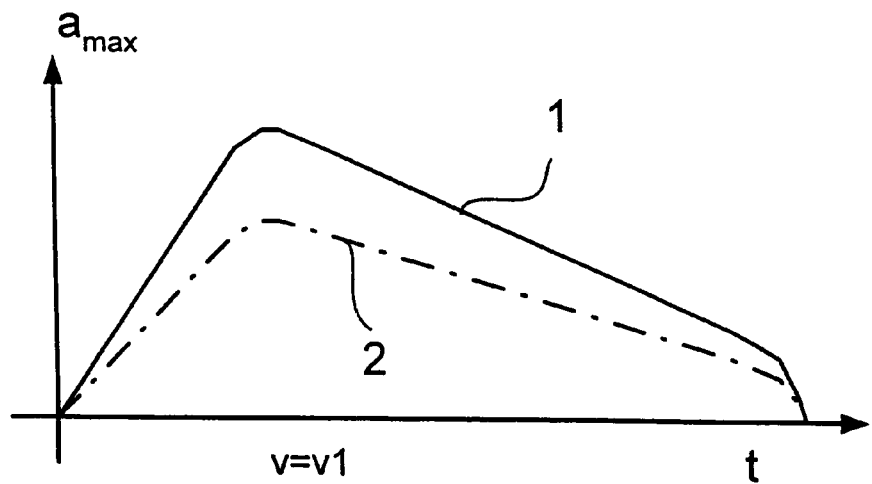
FIG. 3 is a graph of the longitudinal acceleration progression that is increased compared to regular operation.
Figure 4:
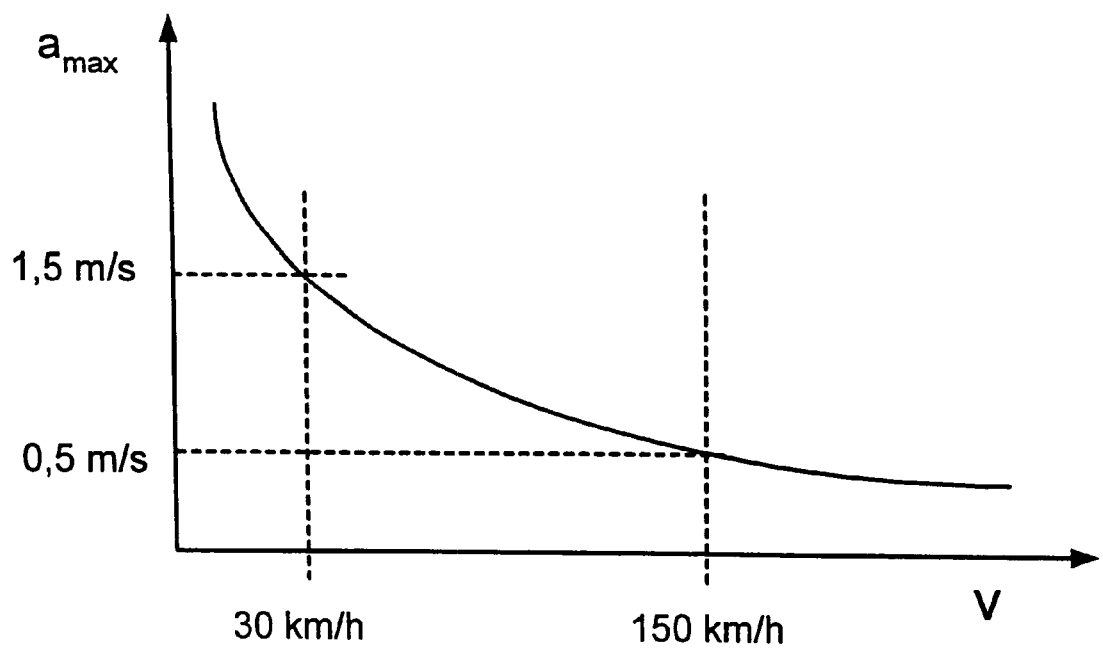
FIG. 4 is a graph of the additional dependence of the longitudinal acceleration progression on the vehicle speed.

FIG. 3 shows the maximum longitudinal acceleration $a_{max}$ over time t (for a certain vehicle speed v=v1). At maximum entering probability (w=1), the maximum longitudinal acceleration progression 1 (including the typical longitudinal acceleration gradient for generating an acceleration "jerk" at the beginning of the acceleration) is specified. During regular operation, in particular, with minimum entering probability w=0, the longitudinal acceleration progression 2 is specified. Intermediate values are possible. In particular, the longitudinal acceleration progressions 1 and/or 2 can additionally be specified variably also in dependence on the vehicle speed v in accordance with the progression of the maximum longitudinal acceleration $a_{max}$, shown in FIG. 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for longitudinally controlling a vehicle having a navigation system which stores roadway information, the method comprising the acts of:
obtaining the roadway information from the navigation system;
determining a probability with which the vehicle will drive onto a highway entrance based on the roadway information; and
specifying a longitudinal acceleration for the vehicle that is greater than the longitudinal acceleration during regular operation when the probability is greater than a specified threshold value.

2. The method according to claim 1, further comprising the act of specifying both the longitudinal acceleration and a longitudinal acceleration gradient at increased levels in dependence on a speed of the vehicle.

3. The method according to claim 1, wherein the act of determining the probability comprises the acts of:
performing a check of the roadway information at a beginning of each current defined route segment as to whether at least one of:
a highway entrance exists and the highway entrance is located on a programmed route of the vehicle; and at least one operating parameter of the vehicle indicates a desire on the part of the driver to enter a highway.

4. The method according to claim 2, wherein the act of determining the probability comprises the acts of:
performing a check of the roadway information at a beginning of each current defined route segment as to whether at least one of:
a highway entrance exists and the highway entrance is located on a programmed route of the vehicle; and at least one operating parameter of the vehicle indicates a desire on the part of the driver to enter a highway.

5. A control device for longitudinally controlling a vehicle equipped with a navigation system that stores roadway information, the control device comprising:
means for obtaining the roadway information from the navigation system;
means for determining a probability with which the vehicle will drive onto a highway entrance based on the roadway information; and
means for specifying a longitudinal acceleration for the vehicle that is greater than the longitudinal acceleration during regular operation when the probability is greater than a specified threshold value.

6. Control device according to claim 5, further comprising means for specifying both the longitudinal acceleration and a longitudinal acceleration gradient at increased levels in dependence on a speed of the vehicle.

7. Control device according to claim 5, further comprising means for performing a check of the roadway information at a beginning of each current defined route segment as to whether at least one of:
a highway entrance exists and the highway entrance is located on a programmed route of the vehicle; and at least one operating parameter of the vehicle indicates a desire on the part of the driver to enter a highway.

8. A computer product for longitudinally controlling a vehicle equipped with a navigation system that stores roadway information, the computer product comprising a computable readable medium having stored thereon program code segments that:
obtain the roadway information from the navigation system;
determine a probability with which the vehicle will drive onto a highway entrance based on the roadway information; and
specify a longitudinal acceleration for the vehicle that is greater than the longitudinal acceleration during regular operation when the probability is greater than a specified threshold value.

* * * * *